United States Patent [19]

Ruscheweyh

[11] Patent Number: 5,234,672

[45] Date of Patent: Aug. 10, 1993

[54] METHOD AND APPARATUS FOR INCREASING THE SEPARATING CAPACITY OF A FLUE GAS DESULFURIZATION APPARATUS

[75] Inventor: H. Ruscheweyh, Aachen, Fed. Rep. of Germany

[73] Assignee: Balcke-Dürr Aktiengesellschaft, Ratingen, Fed. Rep. of Germany

[21] Appl. No.: 867,171

[22] Filed: Apr. 10, 1992

[30] Foreign Application Priority Data

Apr. 19, 1991 [DE] Fed. Rep. of Germany ....... 4112750

[51] Int. Cl.$^5$ ............................................. C01B 17/00
[52] U.S. Cl. ........................ 423/243.08; 423/243.01; 423/242.1; 422/176; 422/228
[58] Field of Search .......... 422/176, 228, 255, 243.08, 422/243.01; 423/242.11, DIG. 16; 55/73, 93, 94, 257.1; 261/118, 17, DIG. 9

[56] References Cited

U.S. PATENT DOCUMENTS

| | | | |
|---|---|---|---|
| 3,702,048 | 11/1972 | Howick | 55/257 |
| 3,966,438 | 6/1976 | Nicholson | 261/17 |
| 4,099,925 | 7/1978 | Yanagioka et al. | 423/242 R |
| 4,293,524 | 10/1981 | Teller et al. | 423/242 R |
| 4,419,331 | 12/1983 | Montalvo | 422/170 |
| 4,762,686 | 8/1988 | Lehto | 55/256 |
| 4,957,716 | 9/1990 | Cichanowicz et al. | 423/242 |
| 4,971,768 | 11/1990 | Ealba et al. | 422/176 |

FOREIGN PATENT DOCUMENTS

0273508 12/1987 European Pat. Off. .
3410109 10/1985 Fed. Rep. of Germany .
3923134 1/1991 Fed. Rep. of Germany .

OTHER PUBLICATIONS

Patent Abstracts of Japan; Dec. 23, 1983, No. 58-166924.

Primary Examiner—Robert J. Warden
Assistant Examiner—Hien Tran
Attorney, Agent, or Firm—Robert W. Becker & Associates

[57] ABSTRACT

For increasing the separating capacity of a flue gas desulfurization apparatus, it is suggested to provide at least one baffle plate within the end section of the flue gas channel connected to the desulfurization reactor. The method for increasing the separating capacity of a flue gas desulfurization apparatus comprises the steps of guiding the flue gas through the flue gas channel in an essentially two-dimensional horizontal flow into the desulfurization reactor; arranging at least one baffle plate within an end section of the flue gas channel in the vicinity of the desulfurization reactor; generating at least one turbulence system with a stationary turbulence after system at a forward edge of the baffle plate; and transforming the essentially two-dimensional horizontal flow of the flue gas into a three-dimensional vertical upward flow by interweaving individual flow strands of the two-dimensional horizontal flow in the turbulence system with the stationary turbulence after system before the flue gas enters the scrubbing zone.

2 Claims, 3 Drawing Sheets 5,234,672

METHOD AND APPARATUS FOR INCREASING THE SEPARATING CAPACITY OF A FLUE GAS DESULFURIZATION APPARATUS

BACKGROUND OF THE INVENTION

The present invention relates to a method and apparatus for increasing the separation capacity of flue gas desulfurization apparatus, especially in power plants, with at least one desulfurization reactor having at least one flue gas channel connected thereto at a bottom portion, whereby the flue gas channel extends essentially horizontally, and the flue gas flows through the desulfurization reactor in a vertical upward direction.

Flue gas desulfurization apparatus of the aforementioned kind are especially known in power plants. The flue gas flows through an essentially horizontally extending flue gas channel from the side into the bottom portion of the desulfurization reactor. The flue gas flow is then deflected into a vertical direction so that it flows through the desulfurization reactor from the bottom to the top. At the inner edge of the reactor inlet the flue gas flow is subjected to a sharp turn so that at this location the flow is separated. Furthermore, the flow path of the flue gas present in the upper portion of the flow gas channel in direction toward the first scrubbing zone of the desulfurization reactor is relatively short, while the flow path of the flue gas within the lower portion of the flue gas channel which is guided into the rearward section of the desulfurization reactor is considerably longer so that the flue gas overall is subjected to very different flow paths during the transport from the flue gas channel into the first scrubbing zone of the desulfurization reactor.

Besides the aforementioned disadvantageous flow separation within the area of the inner edge of the desulfurization reactor inlet, a further disadvantage of the known apparatus is that flue gas portions which are guided into the rearward section of the desulfurization reactor have a substantially longer contact time with the descending lime emulsion flow as compared to the flue gas portion which enters the desulfurization reactor in the area of the inner edge. Measurements have demonstrated that due to the longer contact time of the flue gas in the rearward section of the desulfurization reactor already up to 80% of the sulfur contents are absorbed while the separation degree within the flue gas in the forward section of the reactor is very small because the flue gas entering the desulfurization reactor in the area of the inner edge has only a very short contact time with the descending lime emulsion flow until it reaches the first scrubbing zone of the desulfurization reactor.

In this manner, a strongly unsymmetric distribution of the degree of separation occurs which may not be compensated on the further upward path through the scrubbing zones because of the lack of transverse exchange of the flow.

In order to achieve the overall separation degree which is required by law it is thus necessary to provide a large amount of lime emulsion. Furthermore, it is necessary to install a plurality of scrubbing zones. All these measures together result in a great construction volume of the desulfurization reactor and also in very high energy costs for its operation, since the lime emulsion must be fed into the system at a high pressure and the great construction height of the desulfurization reactor requires great pumping pressures.

It is therefore an object of the present invention to provide a method and an apparatus for increasing the separation capacity of flue gas desulfurization apparatus of the aforementioned kind.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
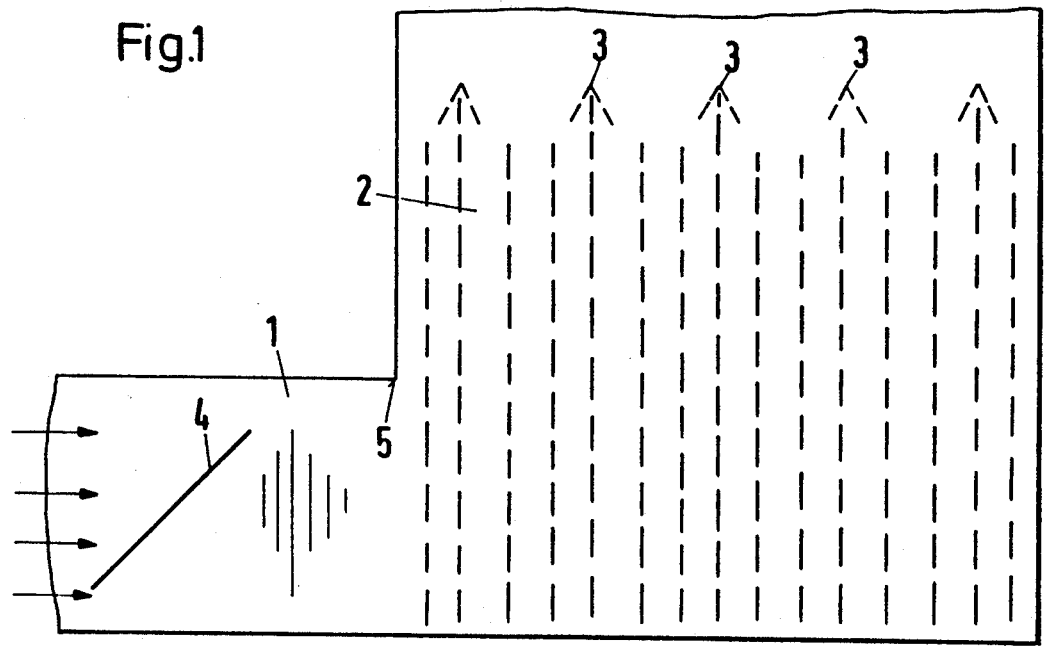
FIG. 1 is a side view of the end section of a flue gas channel and the bottom portion of a desulfurization reactor of a flue gas desulfurization apparatus, which is not represented in further detail in the drawing.

The method for increasing the separating capacity of a flue gas desulfurization apparatus of the present invention is primarily characterized by the following steps:

Guiding the flue gas through the flue gas channel in an essentially two-dimensional horizontal flow into the desulfurization reactor;

Arranging at least one baffle plate within the end section of the flue gas channel in the vicinity of the desulfurization reactor;

Generating at least one turbulence system with a stationary turbulence after system at a forward edge of the baffle plate; and Transforming the essentially two-dimensional horizontal flow of the flue gas into a three-dimensional vertical upward flow by interweaving individual flow strands of the two-dimensional horizontal flow in the turbulence system with the stationary turbulence after system before the flue gas enters the scrubbing zone.

It is preferable that the three-dimensional vertical upward flow is maintained in the scrubbing zone.

Due to the inventive transformation of the two-dimensional flow within the essentially horizontally extending flue gas channel into a three-dimensional flow, i.e., individual flow strands are interwoven, which is simultaneously deflected into the vertical upward direction, a contact time of essentially the same length with the descending lime emulsion flow results for all of the individual flow strands so that the flue gas enters the first scrubbing zone of the desulfurization reactor with approximately the same degree of separation of sulfur dioxide. The flow and direction transformation according to the present invention is achieved in an especially efficient (low-loss) manner due to the provision of a baffle plate which generates at least one turbulence system at a forward edge for interweaving the individual flow strands of the two-dimensional horizontal flow within the flue gas channel and, simultaneously, deflects the flow from its horizontal flow direction into the vertical flow direction so that furthermore the flow separation at the inner edge is prevented (the inner edge being formed by the upper horizontal wall of the flue gas channel and the forward vertical wall of the desulfurization reactor). Since the baffle plate generates a stationary turbulence after system which essentially does not change its position, respectively, changes air position only to a neglectable degree, and which generates only a neglectably small reduction of the flow cross-section, the flow transformation and deflection is especially efficient, respectively, low-loss. Furthermore, the flow transformation and deflection does not exhibit any dependence with respect to changes of the flue gas volume.

With the inventive method an especially favorable equalization of the contact time for the flue gas flowing from the flue gas channel into the desulfurization reactor is achieved so that a uniform and high separation efficiency is accomplished over the entire flow cross-section of the desulfurization reactor. This allows for a reduction of the construction size of the reactor and a reduction of the amount of lime emulsion to be fed into the system so that with the inventive method a substantial reduction of construction and operation costs is accomplished.

According to a further embodiment of the present invention, the three-dimensional vertical upward flow is maintained within the scrubbing zone of the desulfurization reactor so that in this area the formation of individual flow strands of varying separation degrees is avoided.

The apparatus for increasing the separation capacity of a flue gas desulfurization apparatus according to the present invention is primarily characterized by at least one desulfurization reactor with at least one scrubbing zone and a bottom portion; at least one flue gas channel connected with one end section to the desulfurization reactor at the bottom portion, the flue gas channel extending essentially horizontally, with flue gas being guided through the flue gas channel in an essentially horizontal flow into the desulfurization reactor and flowing through the desulfurization reactor in a vertical upward flow; and at least one baffle plate connected to the end section of the flue gas channel. The apparatus is especially suitable for power plants. The baffle plate is preferably mounted such that it is adjustable, preferably by a respective drive, in order to be adjustable to greatly varying operating conditions which may arise, for example, due to changes of the flue gas volume fed into the desulfurization reactor, the flue gas temperature, and the contents of sulfur dioxide.

DESCRIPTION OF PREFERRED EMBODIMENTS

The present invention will now be described in detail with the aid of several specific embodiments utilizing FIGS. 1 through 6.

Figure 2:
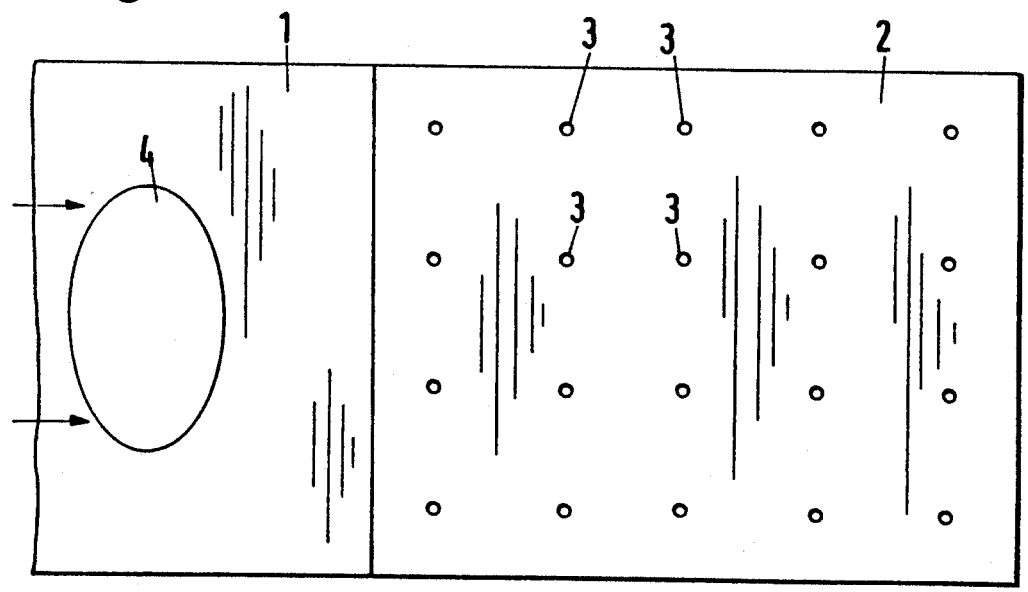
FIG. 2 shows a plan view of the portion of the apparatus of FIG. 1.

The following parts of a flue gas desulfurization apparatus are represented in FIGS. 1 and 2: The end of a flue gas channel 1 which extends essentially horizontally and opens into the bottom portion of a desulfurization reactor housing 2. This reactor housing 2 has essentially a rectangular cross-section and extends over a great length in an upward vertical direction and contains at least one, optionally, a plurality of scrubbing zones in which a plurality of spray nozzles 3 is distributed. With the assistance of these spray nozzles 3, a lime emulsion, as is schematically represented in FIG. 1, is evenly distributed over the entire cross-section of the reactor housing 2 whereby this lime emulsion falls to the bottom of the reactor housing 2.

In the end section of the flue gas channel 1, a baffle plate 4, essentially a turbulence generating surface, is fixedly arranged at an acute angle relative to the flow direction of the flue gas. In the shown embodiment, the baffle plate 4 has the shape of an oval flat plate. The baffle plate 4 may also be in the form of a circular, delta-shaped or rhombic plate. Such plates must not be provided with a flat surface, they may be bent, angled or provided with angled or bent edges.

The determining factor is that the baffle plate 4 with its main extension is arranged at an acute angle relative to the flow direction of the flue gas in the end section of the flue gas channel 1. The flowing flue gasses are represented by arrows in FIGS. 1 and 2. With the inventive arrangement of the baffle plate 4 in the end section of the flue gas channel 1, the edges of the baffle plate 4 generate a forward edge turbulence system which transforms the horizontal two-dimensional flow of the flue gas within the flue gas channel 1 into a three-dimensional flow which is additionally deflected into the vertical direction, as can be seen especially in FIGS. 3 and 4. This flow transformation and flow deflection is created by a stationary turbulence after system which is represented with the aid of individual flow strands in FIGS. 3 to 6.

Figure 3:
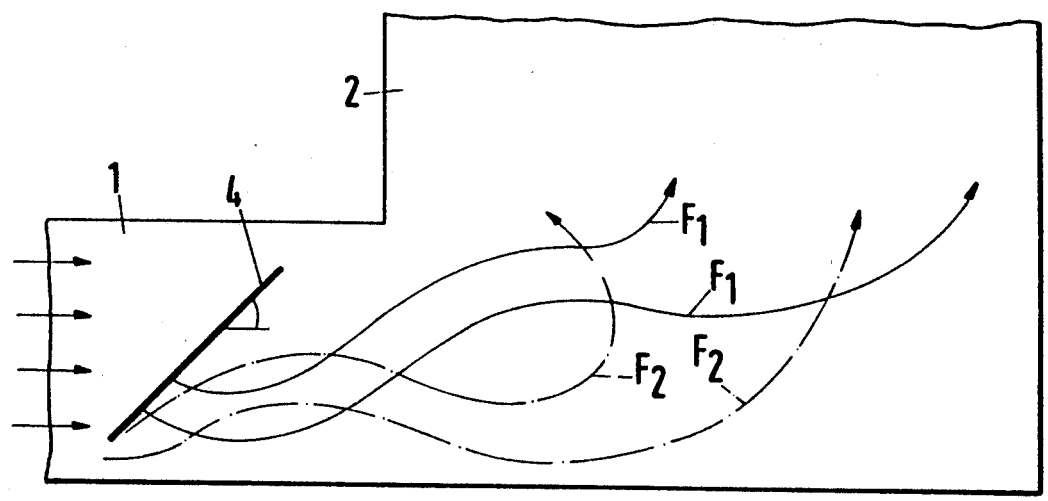
FIG. 3 is a side view corresponding to the representation of FIG. 1 in which the flow path of two pairs of individual flow strands is shown, their turbulence being created by the bottom half of the baffle plate.
Figure 4:
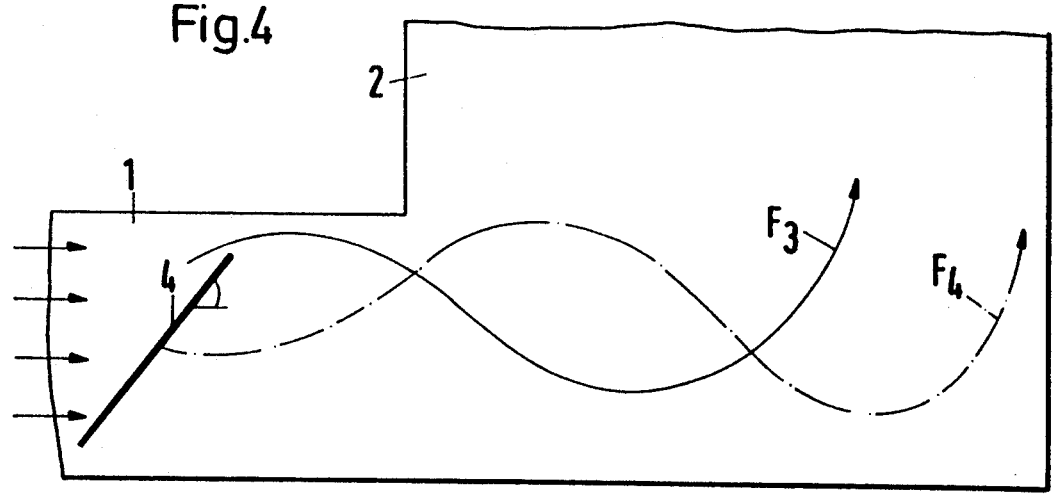
FIG. 4 is a side view of the individual flow strands corresponding to the view of FIG. 3, the turbulence being generated by the upper portion of the baffle plate.
Figure 5:
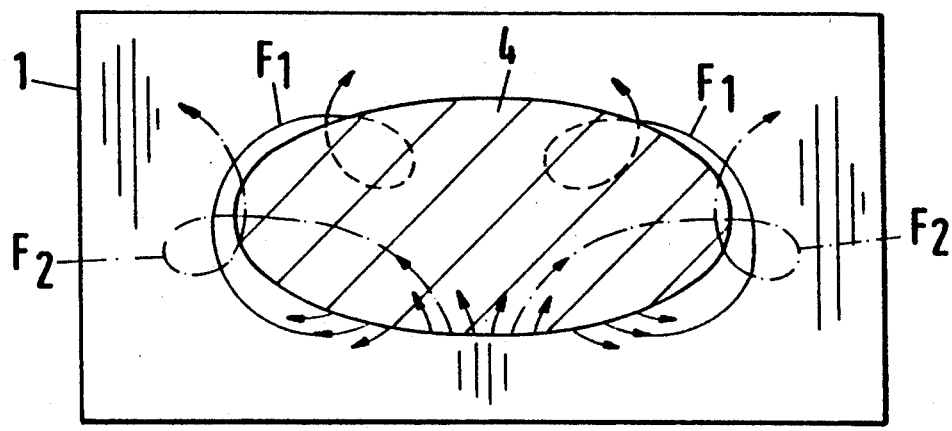
FIG. 5 is a view in the horizontal direction of the flue gas channel in the flow direction of the flue gas illustrating the individual flow strands of FIG. 3.
Figure 6:
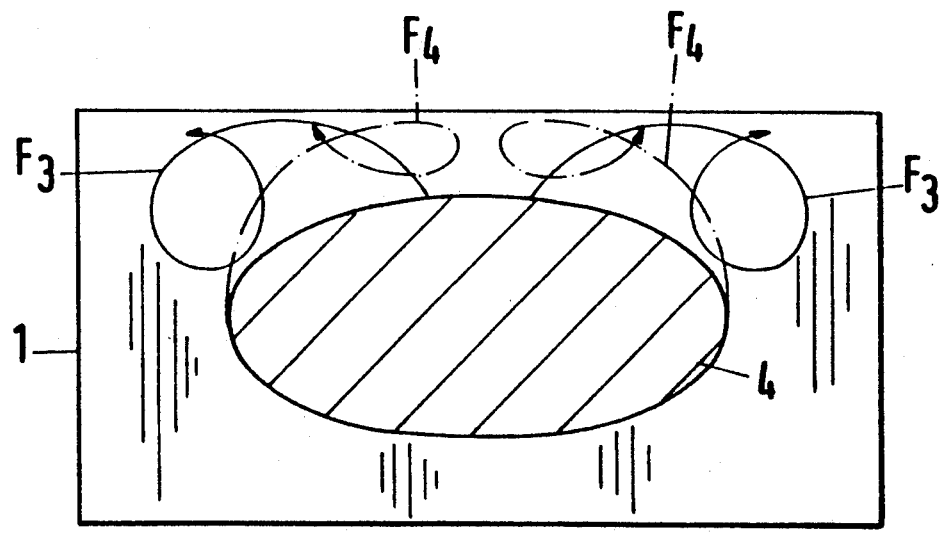
FIG. 6 is a representation corresponding to the view of FIG. 5 showing the individual flow strands of FIG. 4.

In corresponding FIGS. 3 and 5, two pairs of individual flow strands F1 and F2 are represented which are respectively generated by the lower half of the baffle plate 4, as can be seen in FIG. 5. Corresponding FIGS. 4 and 6 represent individual flow strands F3 and F4 which are generated by the upper half of the baffle plate 4. These different flow strands F1 to F4 have deliberately been represented in two separate drawings in order to illustrate their different flow paths. FIGS. 3 to 6 show that the two-dimensional flow within the flue gas channel 1, represented by parallel arrows, are transformed into a three-dimensional, i.e., turbulent flow, by the forward edge turbulence system with the stationary turbulence after system created by the baffle plate 4. Simultaneously, the flue gas flow is deflected from its horizontal flow direction into a vertical flow direction. At the same time, the individual flow strands F1 to F4 are interwoven as can be seen in FIGS. 3 and 4 as well as in FIGS. 5 and 6.

The installation of the baffle plate 4 within the end section of the flue gas channel 1 results in an efficient (low-loss) deflection of the flue gas flow from the flue gas channel 1 into the reactor housing 2 and, simultaneously, in an intensive mixing of the individual flow strands which are symbolized in the drawings by the flow strands F1 to F4.

In this manner, all portions of the flue gas flowing within the flue gas channel 1 are provided with the same contact time within the bottom portion of the reactor housing 2, because their flow path lengths in this bottom portion of the reactor housing 2 are essentially identical. The pre-separation of sulfur-dioxide within the bottom portion of the reactor housing 2, caused by the descending lime emulsion flow, is thus essentially constant over the entire flow cross-section of the reactor housing 2. Since the three-dimensional flow of the deflected flue gas flow is maintained also within the scrubbing zone of the desulfurization reactor, symbolized by the spray nozzles 3, a separating capacity that is constant over the entire flow cross-section of the reactor housing 2 results. This separation capacity is substantially greater than the separation capacity of known desulfurization reactors of flue gas desulfurization apparatus because in the prior art apparatus a flow separation is created within the area of the inner edge 5 (see FIG. 1), which, together with the substantially shorter flow paths of the flue gasses coming from the upper portion of the flue gas channel 1, results in a zone with a substantially decreased pre-separation. The correspondingly formed flue gas flow strands of varying sulfur dioxide contents may not be equilibrated even when a plurality of scrubbing zones is provided within the reactor housing 2 through which the flue gas must pass.

Since for an apparatus with a baffle plate 4 installed within the end section of the flue gas channel 1, due to the formation of a three-dimensional flow within the bottom portion of the reactor housing 2 a uniform separation efficiency within the reactor is achieved, the amount of lime emulsion fed into the system may be reduced. Accordingly, the operating costs of the flue gas desulfurization apparatus are reduced, especially because the pumping power for the pumping of the lime emulsion to the spray nozzles 3 is also reduced. Furthermore, it is possible to reduce the height of the reactor housing 2 because the more uniform flue gas flow and the uniform pre-separation of sulfur dioxide over the entire flow cross-section allows the reduction of the number of scrubbing zones. Thus, the construction volume of the reactor housing 2 may be decreased. As a result, the installation costs for the flue gas desulfurization apparatus are also decreased.

The substantial increase of the separation capacity of the flue gas desulfurization apparatus of the present invention relative to the prior art is achieved with simple technical means. The baffle plates 4 are simple components which may be fixedly installed within the flue gas channel 1. Only when the volume of the flue gas to be desulfurized varies strongly, it may be advantageous to provide the baffle plate 4 with a drive in order to be able to adjust its position. In order to accomplish an optimal adjustment of the baffle plate 4 during the startup of a flue gas desulfurization apparatus, it is furthermore advantageous to provide the baffle plate 4 in an adjustable manner.

The present invention is, of course, in no way restricted to the specific disclosure of the specification and drawings, but also encompasses any modifications within the scope of the appended claims.

What I claim is:

1. A method for increasing the separating capacity of a flue gas desulfurization apparatus comprising the step of: providing at least one desulfurization reactor with at least one scrubbing zone and at least one flue gas channel connected to said desulfurization reactor at a bottom portion thereof, said flue gas channel extending essentially horizontally, guiding a flue gas through said flue gas channel in an essentially two-dimensional horizontal flow;

positioning at least one turbulence generating baffle plate with at least one forward edge within an end section of said flue gas channel adjacent to said desulfurization reactor;

wherein at least one forward edge turbulence system is generated with said at least one forward edge of said at least one baffle plate, said forward edge turbulence system comprised of pairs of vortices creating a stationary turbulence after system after said baffle plate in a flow direction of the flue gas, with said vortices of said pairs of vortices each rotating in opposite directions, thereby transforming said essentially two-dimensional horizontal flow of the flue gas within the flue gas channel into a three-dimensional vertical upward flow within said desulfurization reactor by interweaving individual flow strands of said two-dimensional horizontal flow and deflecting the interwoven flow strands into the vertical upward direction before the flue gas enters said at least one scrubbing zone.

2. A method according to claim 1, wherein said three-dimensional vertical upward flow is maintained within said at least one scrubbing zone.

* * * * *